US008477030B2

(12) United States Patent
Otani et al.

(10) Patent No.: US 8,477,030 B2
(45) Date of Patent: Jul. 2, 2013

(54) OPTICAL AMPLIFIER MODULE AND DISPERSION COMPENSATION FIBER LOSS DETECTION METHOD

(75) Inventors: Tomotaka Otani, Kawasaki (JP); Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 12/662,140

(22) Filed: Mar. 31, 2010

(65) Prior Publication Data

US 2010/0271204 A1 Oct. 28, 2010

(30) Foreign Application Priority Data

Apr. 22, 2009 (JP) ................................ 2009-103599

(51) Int. Cl.
- *G08B 21/00* (2006.01)
- *H01S 3/00* (2006.01)
- *G02F 1/03* (2006.01)
- *G02F 1/29* (2006.01)
- *H04B 10/00* (2006.01)
- *H04B 10/04* (2006.01)
- *H04B 10/12* (2006.01)

(52) U.S. Cl.
USPC ................ 340/540; 359/337.11; 359/337.1; 359/249; 359/298; 398/158; 398/200; 398/147; 398/148

(58) Field of Classification Search
USPC .............. 340/540, 459, 461, 539; 398/6, 158, 398/11, 18, 37, 177, 181, 197, 195, 192, 398/182; 359/124, 110, 337.1, 337.11, 188, 359/179, 173
See application file for complete search history.

(56) References Cited

U.S. PATENT DOCUMENTS

| | | | |
|---|---|---|---|
| 6,201,635 B1 | 3/2001 | Yamanaka et al. | |
| 6,327,076 B1 * | 12/2001 | Akiyama | 359/337.11 |
| 7,880,960 B2 | 2/2011 | Komaki et al. | |
| 2001/0004290 A1 * | 6/2001 | Lee et al. | 359/124 |
| 2002/0027703 A1 * | 3/2002 | Kinoshita et al. | 359/337.1 |
| 2002/0067522 A1 * | 6/2002 | Tanaka et al. | 359/110 |
| 2004/0161241 A1 * | 8/2004 | Tomofuji et al. | 398/147 |
| 2009/0324257 A1 * | 12/2009 | Murakami et al. | 398/200 |

FOREIGN PATENT DOCUMENTS

| | | |
|---|---|---|
| JP | 5-276120 | 10/1993 |
| JP | 2000-22639 | 1/2000 |
| JP | 2000-307552 | 11/2000 |
| WO | 2008/081538 A1 | 7/2008 |

OTHER PUBLICATIONS

Japanese Office Action mailed Apr. 2, 2013 for corresponding Japanese Application No. 2009-103599.
Patent Abstracts of Japan, Publication No. 05-276120, published Oct. 22, 1993.

* cited by examiner

*Primary Examiner* — Jennifer Mehmood
*Assistant Examiner* — Mirza Alam
(74) *Attorney, Agent, or Firm* — Staas & Halsey LLP

(57) ABSTRACT

An optical amplifier module includes a first optical amplifier to amplify main signal light to be supplied to a dispersion compensation fiber (DCF), a second optical amplifier to amplify the main signal light supplied from the DCF, a generating part to generate monitoring light having a wavelength longer than a wavelength of the main signal light, a multiplexing part to multiplex the monitoring light generated by the generating part and the main signal light to be supplied to the DCF, a demultiplexing part to demultiplex the monitoring light from the main signal light supplied from the DCF, and a detection part to detect a light intensity of the monitoring light demultiplexed by the demultiplexing part.

20 Claims, 11 Drawing Sheets

OPTICAL AMPLIFIER MODULE AND DISPERSION COMPENSATION FIBER LOSS DETECTION METHOD

CROSS-REFERENCE TO RELATED APPLICATIONS

This application is based upon and claims the benefit of priority of the prior Japanese Patent Application No. 2009-103599, filed on Apr. 22, 2009, the entire contents of which are incorporated herein by reference.

FIELD

The present invention relates to optical amplifier modules that are connected to dispersion compensation fibers and amplify optical signals, and to dispersion compensation fiber loss detection methods.

BACKGROUND

An optical signal propagated through a channel is subjected to a waveform distortion due to the effects of different wavelength dispersion depending on the kind of channel fiber, the transmission distance, the signal waveform and the like. For this reason, a general optical transmission apparatus compensates for the waveform distortion by using a Dispersion Compensation Fiber (DCF) having a characteristic complementary to that of the channel.

In order to achieve the complementary characteristic described above, the DCF varies a refractive index ratio of glass by an additive material, and fabrication parameters and a refractive index profile of the DCF are complex. Because of the complex structure of the DCF, an optical loss in the DCF increases with aging.

FIG. 1 is a diagram illustrating a structure of an example of a conventional optical amplifier module. An optical amplifier module 1 includes therein two optical amplifiers 2 and 3. A DCF module 4 is connected between the two optical amplifiers 2 and 3, in order to compensate for the wavelength dispersion generated in the channel.

On the other hand, a Japanese Laid-Open Patent Publication No. 2000-307552, for example, proposes maintaining an optical output level of wavelength division multiplexed signal light in a wavelength band constant, by inputting pseudo signal lights respectively having wavelengths shorter than and longer than the wavelength band of the wavelength division multiplexed signal light to an optical amplifier, and branching an output of the optical amplifier, in order to control the optical amplifier by the short wavelength and the long wavelength.

The optical amplifier module 1 amplifies the signal light that has been subjected to the loss in the channel by the optical amplifier 2 located at a stage preceding the DCF module 4, and amplifies the signal light that has been reduced in the channel and the DCF module 4 by the optical amplifier 3 located at a stage subsequent to the DCF module 4. The optical amplifiers 2 and 3 respectively at the stages preceding and subsequent to the DCF module 4 have input dynamic ranges on the order of several dB. For this reason, even if the optical loss of the DCF module 4 changes, the optical amplifiers 2 and 3 operate in a normal manner as long as the input dynamic ranges thereof are satisfied.

In addition, because the input and output levels of the optical amplifier module 1 change depending on a change in the number of wavelengths, the loss of the DCF module 4 itself is usually not measured. Consequently, no alarm will be generated even if the loss in the DCF module 4 increases, and in a worst case scenario, there was a problem in that the increase in the loss in the DCF module 4 will not be detected until a signal disconnection occurs.

SUMMARY

Accordingly, it is an object in one aspect of the invention to provide an optical amplifier module and a DCF loss detection method, in which the problem described above is suppressed.

One aspect of the present invention is to provide an optical amplifier module and a DCF loss detection method, which can detect a loss in the DCF.

According to one aspect of the present invention, there is provided an optical amplifier module comprising a first optical amplifier configured to amplify main signal light that is to be supplied to a DCF; a second optical amplifier configured to amplify the main signal light that is supplied from the DCF; a monitoring light generating part configured to generate monitoring light having a wavelength longer than a wavelength of the main signal light; a multiplexing part configured to multiplex the monitoring light generated by the monitoring light generating part and the main signal light that is to be supplied to the DCF; a demultiplexing part configured to demultiplex the monitoring light from the main signal light supplied from the DCF; and a light intensity detection part configured to detect a light intensity of the monitoring light demultiplexed by the demultiplexing part.

According to one aspect of the present invention, there is provided a DCF loss detection method for detecting an optical loss in a DCF coupled to an optical amplifier module having a first optical amplifier configured to amplify main signal light that is to be supplied to a DCF, and a second optical amplifier configured to amplify the main signal light that is supplied from the DCF, comprising generating monitoring light having a wavelength longer than a wavelength of the main signal light, and multiplexing the monitoring light and the main signal light that is to be supplied to the DCF; demultiplexing the monitoring light from the main signal light supplied from the DCF, and detecting a light intensity of the monitoring light that is demultiplexed; and detecting the optical loss value in the DCF from the light intensity of the monitoring light that is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

A description will now be given of the optical amplifier module and the DCF loss detection method in each embodiment according to the present invention.

First Embodiment

Figure 1:
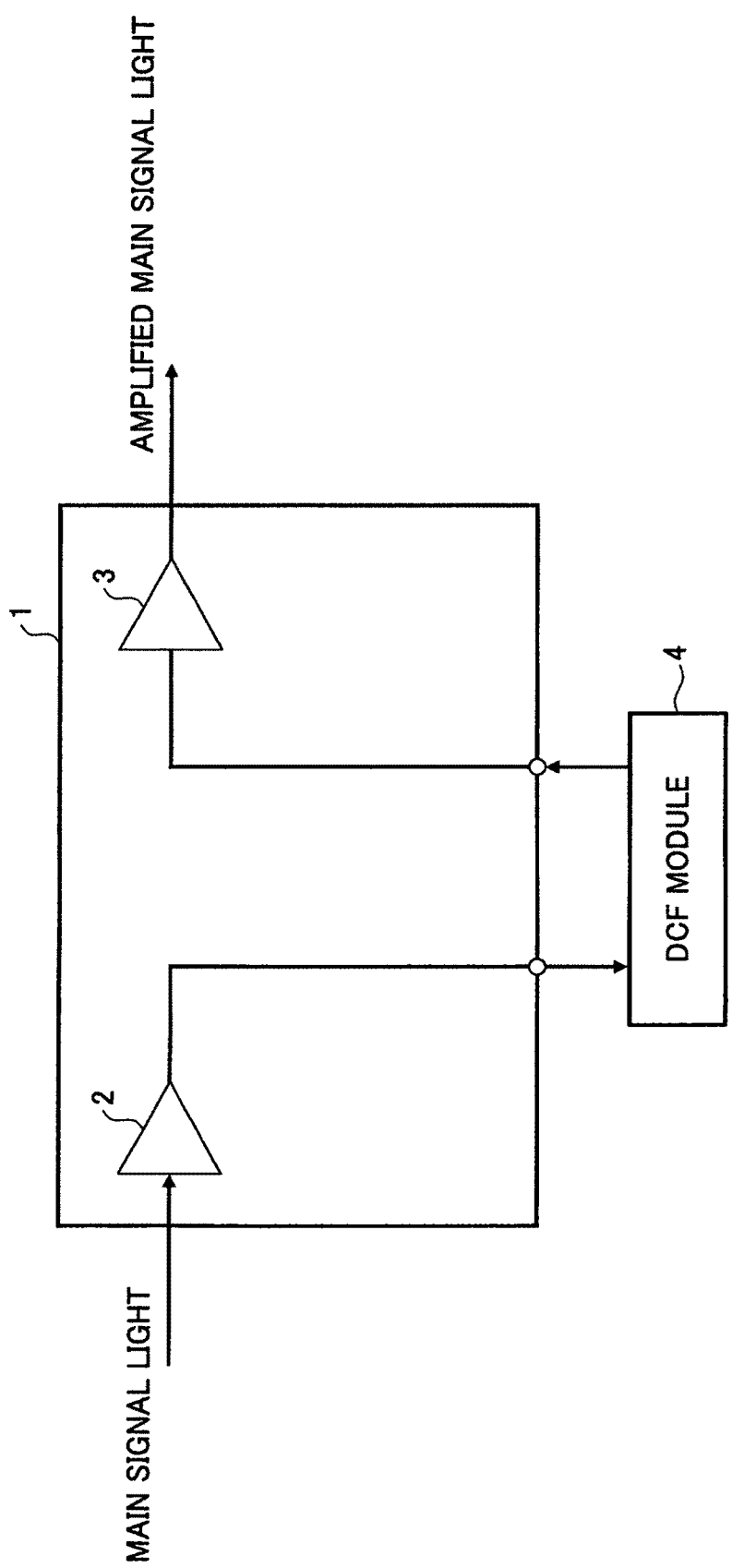
FIG. 1 is a diagram illustrating a structure of an example of a conventional optical amplifier module.
Figure 2:
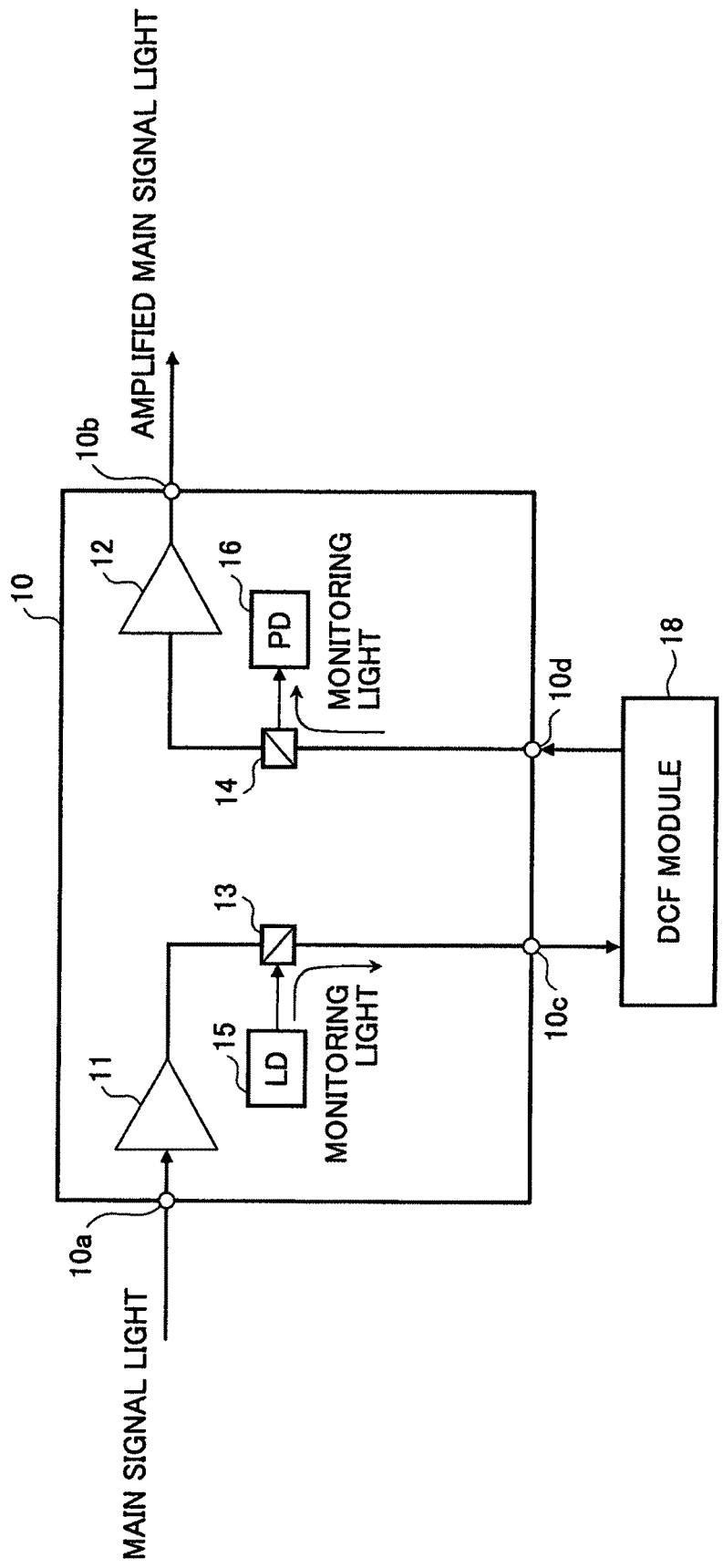
FIG. 2 is a diagram illustrating a structure of an optical amplifier module in a first embodiment of the present invention.

FIG. 2 is a diagram illustrating a structure of the optical amplifier module in a first embodiment of the present invention. In FIG. 2, an optical amplifier module 10 includes optical amplifiers 11 and 12, optical filters 13 and 14, a laser diode (LD) 15, and a photodiode (PD) 16.

The optical amplifier 11 amplifies a wavelength division multiplexed (WDM) signal light, forming a main signal light supplied from a port 10a, and supplies an amplified main signal light to the optical filter 13. The laser diode 15 generates monitoring light having a wavelength different from that of the WDM signal light, and supplies the monitoring light to the optical filter 13. The optical filter 13 multiplexes the monitoring light output from the laser diode 15 and the WDM signal light, and supplies multiplexed signal light to a DCF module 18 via a port 10c.

The optical signal subjected to a dispersion compensation by a DCF within the DCF module 18 is supplied from a port 10d to the optical filter 14. The optical filter 14 demultiplexes the monitoring light and the WDM signal light forming the main signal light, supplies the monitoring light to the photodiode 16, and supplies the WDM signal light forming the main signal light to the optical amplifier 12.

The photodiode 16 detects a light intensity of the monitoring light supplied from the optical filter 14, and supplies a detection voltage indicative of the detected light intensity to a management unit (not illustrated) which forms a host unit. The optical amplifier 12 amplifies the WDM signal light forming the main signal light supplied from the optical filter 14, and outputs the amplified main signal light from a port 10b.

The management unit is capable of recognizing an optical loss value and an optical loss changing amount of the DCF, from the detection voltage indicated of the detected light intensity of the monitoring light.

Figure 3:
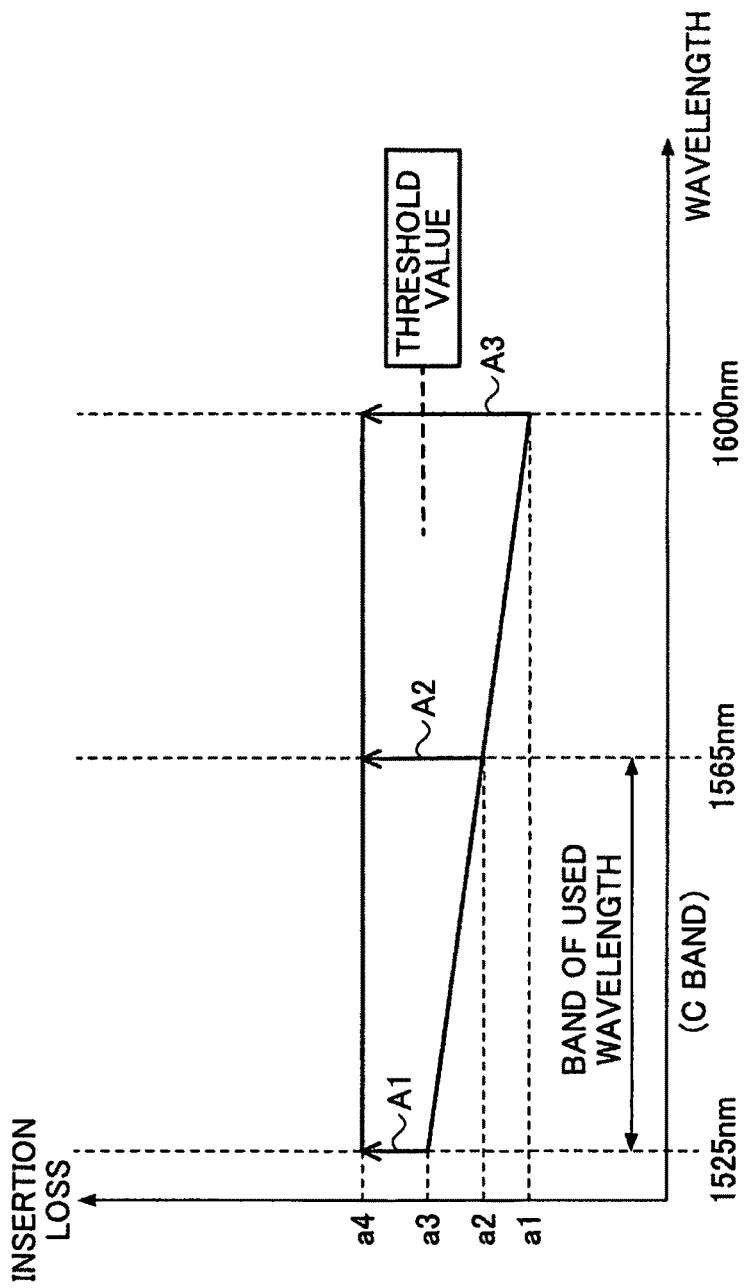
FIG. 3 is a diagram illustrating a change in an optical loss of a DCF with aging.

FIG. 3 is a diagram illustrating a change in the optical loss of the DCF with aging. In FIG. 3, an initial insertion loss a3 at a wavelength of 1525 nm, an initial insertion loss a2 at a wavelength of 1565 nm, and an initial insertion loss a1 at a wavelength of 1600 nm mutually differ. However, an insertion loss due to aging at each of the wavelengths of 1525 nm, 1565 nm and 1600 nm is a4 (a4>a3>a2>a1). In FIG. 3, an arrow A1 indicates the change in the insertion loss at the wavelength of 1525 nm, an arrow A2 indicates the change in the insertion loss at the wavelength of 1565 nm, and an arrow A3 indicates the change in the insertion loss at the wavelength of 1600 nm.

For example, if the insertion loss increases from the initial insertion loss of 0.5 dB in the signal band formed by the C band (wavelengths of 1525 nm to 1565 nm), the insertion loss increases from the initial insertion loss by 1.0 dB at the signal band of 1700 nm. In other words, the change in the insertion loss of the DCF due to aging occurs more conspicuously in the long wavelengths. For this reason, the monitoring light generated by the laser diode 15 is set to have a longer wavelength than that of the WDM signal light forming the main signal light. In the case of the multi-wavelength WDM, it is desirable that the monitoring light satisfies the following conditions.

First, because the main signal light may act as the excitation light and receive the effects of the Raman gain depending on the wavelength region, it is desirable to avoid a wavelength region in which the Raman gain is relatively large, in order for the main signal light not to be easily affected by the Raman gain.

Second, because the optical loss increases as the wavelength increases, it is desirable to use a wavelength that is longer than that of the signal band by approximately 20 nm or greater, in order to secure a detection accuracy for the optical loss changing amount.

Third, it is desirable that the wavelength of the monitoring light is in a wavelength range in which laser diode 15 can oscillate.

Fourth, it is desirable that a sufficiently high quantum efficiency of the photodiode 16 can be secured.

Fifth, it is desirable that the WDM signal light forming the main signal light and the monitoring light can be multiplexed and demultiplexed. Otherwise, if the wavelength of the monitoring light is too close to that of the main signal light, it is not only difficult to detect the change in the optical loss, but it is also necessary to use a multiplexer and demultiplexer having a sharp filter characteristic, which in turn increases the cost of the optical amplifier module 10.

Figure 4:
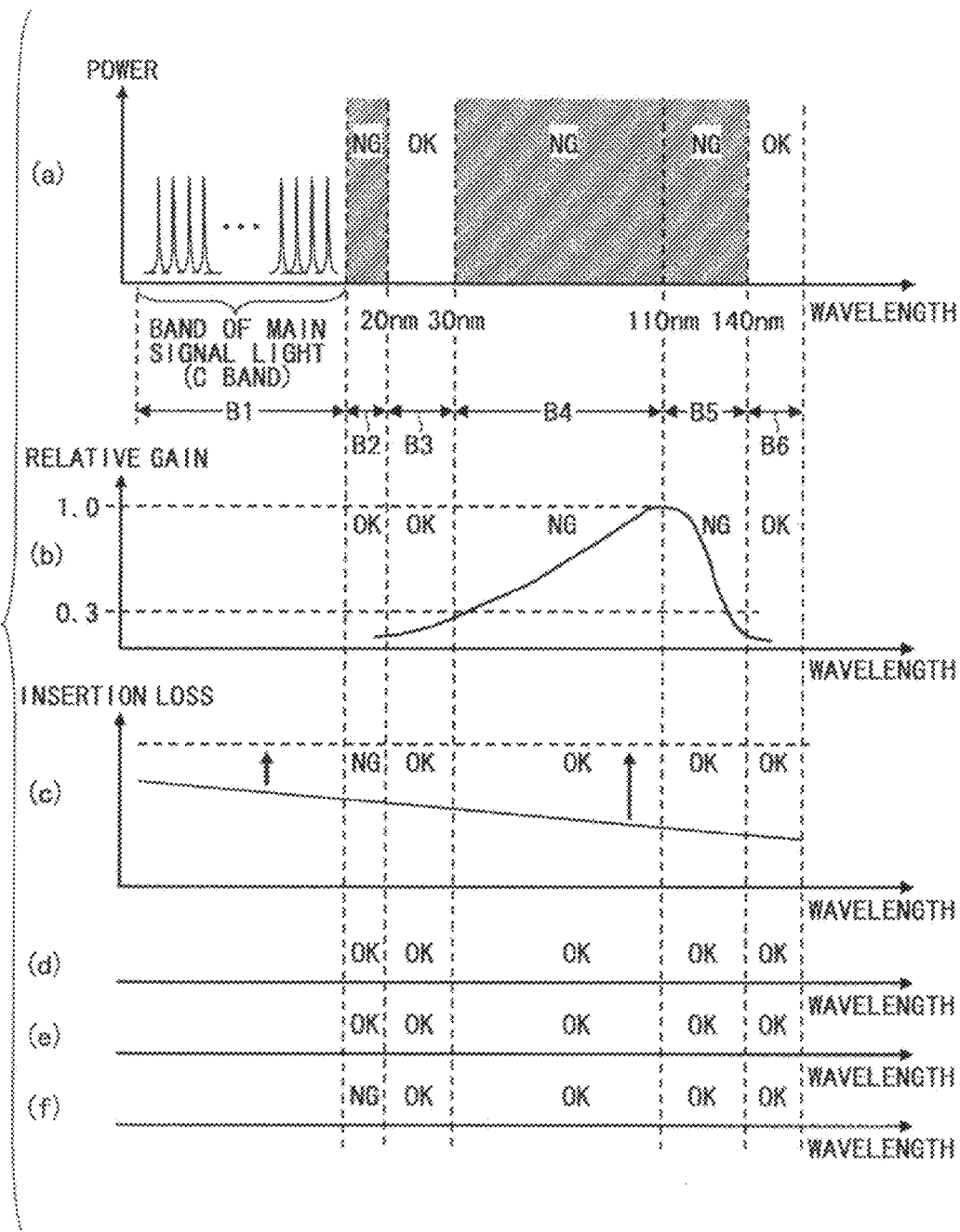
FIG. 4 is a diagram illustrating wavelengths of signal light and monitoring light.
Figure 5:
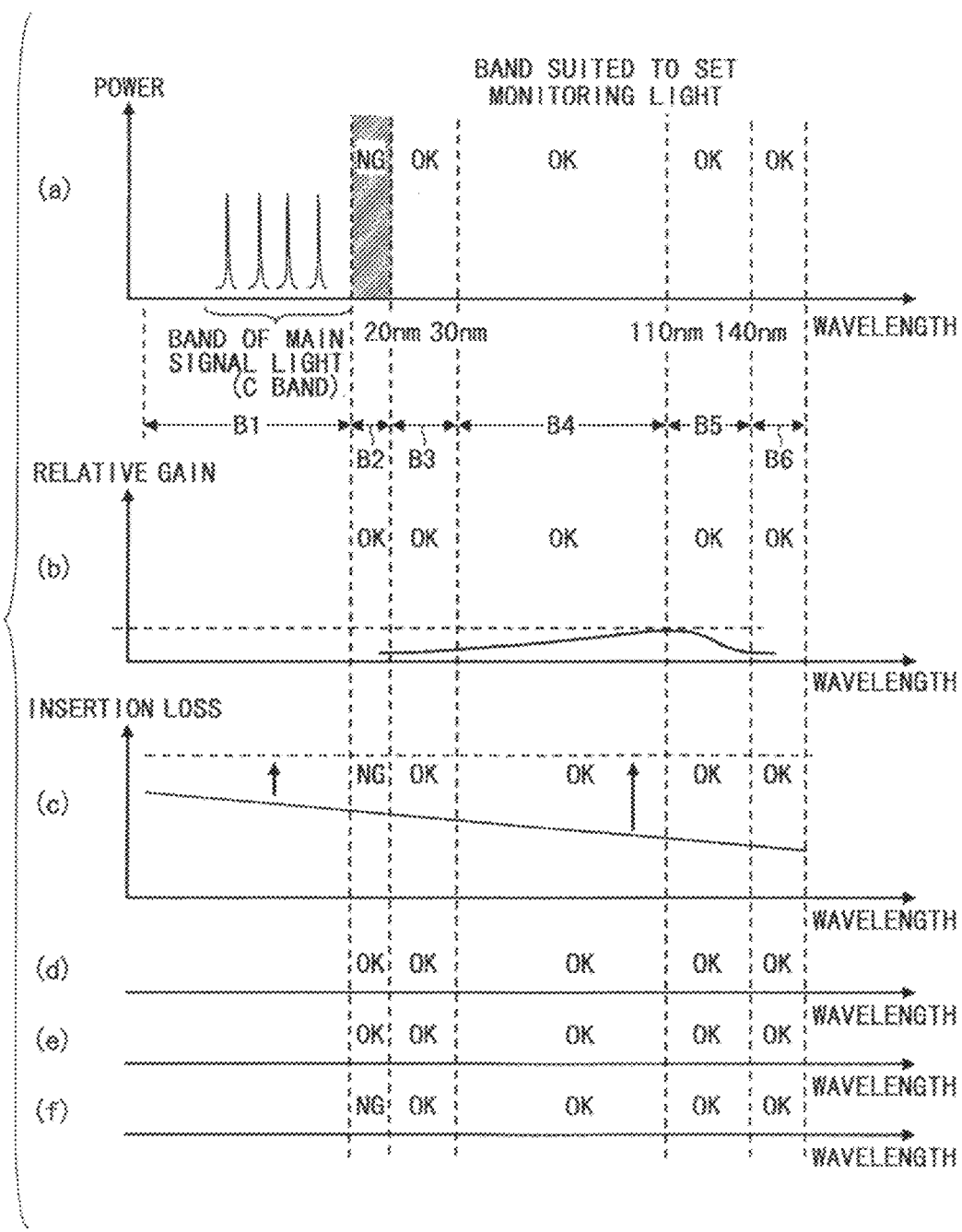
FIG. 5 is a diagram illustrating the wavelengths of the signal light and monitoring light.

FIG. 4 is a diagram illustrating the wavelengths of the signal light and the monitoring light. FIG. 4 illustrates (a) the power versus wavelength characteristic for the wavelength bands, (b) the relative gain versus wavelength characteristic for the Raman gain, (c) the insertion loss versus wavelength characteristic for the DCF loss change, (d) the laser diode oscillation wavelength, (e) the photodiode reception wavelength, and (f) the multiplexed or demultiplexed wavelength of the main signal light and the monitoring light. In FIG. 4 and FIG. 5 which will be described later, "OK (okay)" indicates that the band is satisfactory or acceptable, and "NG (no good)" indicates that the band is unsatisfactory or unacceptable.

In the case of the multi-wavelength WDM illustrated in FIG. 4, it may be regarded that the effects of the Raman gain is dominant particularly with respect to the main signal light. An effective cross sectional area of a core of the DCF is relatively small, and the Raman effect is more likely to occur in the DCF compared to the Single Mode Fiber (SMF) that is generally used. In addition, in the DCF, the light of one or a plurality of main signal light passing the DCF may act as the excitation light and cause the Raman amplification, depending on the optical power of the one or the plurality of main signal light and the positional relationship between the one or the plurality of main signal light and the monitoring light wavelength.

As illustrated in FIG. 4, if the main signal light is in the 1550 nm band (C band), the Raman gain increases from the wavelength (that is, 1550 nm band) of the excitation light and becomes a maximum in the long wavelength region of 100 nm to 110 nm. However, the Raman gain also increases in the wavelength region shorter than the long wavelength region of 100 nm to 110 nm, towards the wavelength of 100 nm. Hence, it is preferable not to set the monitoring light in the long wavelength region (band B4) exceeding 30 nm. In addition, the Raman gain sharply decreases from the wavelength of the excitation light in the wavelength region (band B5) exceeding 110 nm, and the Raman gain is almost zero in the band B6 of 140 nm or greater. Accordingly, the monitoring light is desirably set in the band B3 in the long wavelength region of 20 nm to 30 nm or, in the band B6 in the long wavelength region of 140 nm or greater. A band B1 of the main signal light (or C band) and the band B3 sandwich a band B2 therebetween.

FIG. 5 is a diagram illustrating the wavelengths of the signal light and the monitoring light. FIG. 5 illustrates (a) the power versus wavelength characteristic for the wavelength bands, (b) the relative gain versus wavelength characteristic for the Raman gain, (c) the insertion loss versus wavelength characteristic for the DCF loss change, (d) the laser diode oscillation wavelength, (e) the photodiode reception wavelength, and (f) the multiplexed or demultiplexed wavelength of the main signal light and the monitoring light.

In the case of a single wavelength or a relatively small number of wavelengths as illustrated in FIG. 5, the total power of the main signal light becomes extremely small, unlike the multi-wavelength WDM, and the effects of the Raman gain is substantially negligible. Accordingly, in this case, the monitoring light can be set in the bands B3 through B6 in the long wavelength region of 20 nm to 150 nm or greater.

The laser diode 15 may be formed by a Distributed Feed-Back Laser Diode (DFB-LD), a Full Band Tunable Laser Diode (FBT-LD) operating on the same oscillation principle as the DFB-LD, a Fabry-Perot Laser Diode (FB-LD), or the like.

A non-linear phenomenon easily occurs because of the small effective cross sectional area of the DCF. For this reason, effects of Stimulated Brillouin Scattering (SBS) may occur depending on the kind of the laser diode 15 that is used.

The DFB-LD and the FBT-LD having a relatively narrow spectrum width and a relatively large power component (power density) for each wavelength can reduce the SBS using a technique that spreads the spectrum width by subjecting an injection current of the laser diode (LD) to a relatively small amplitude modulation.

Figure 6:
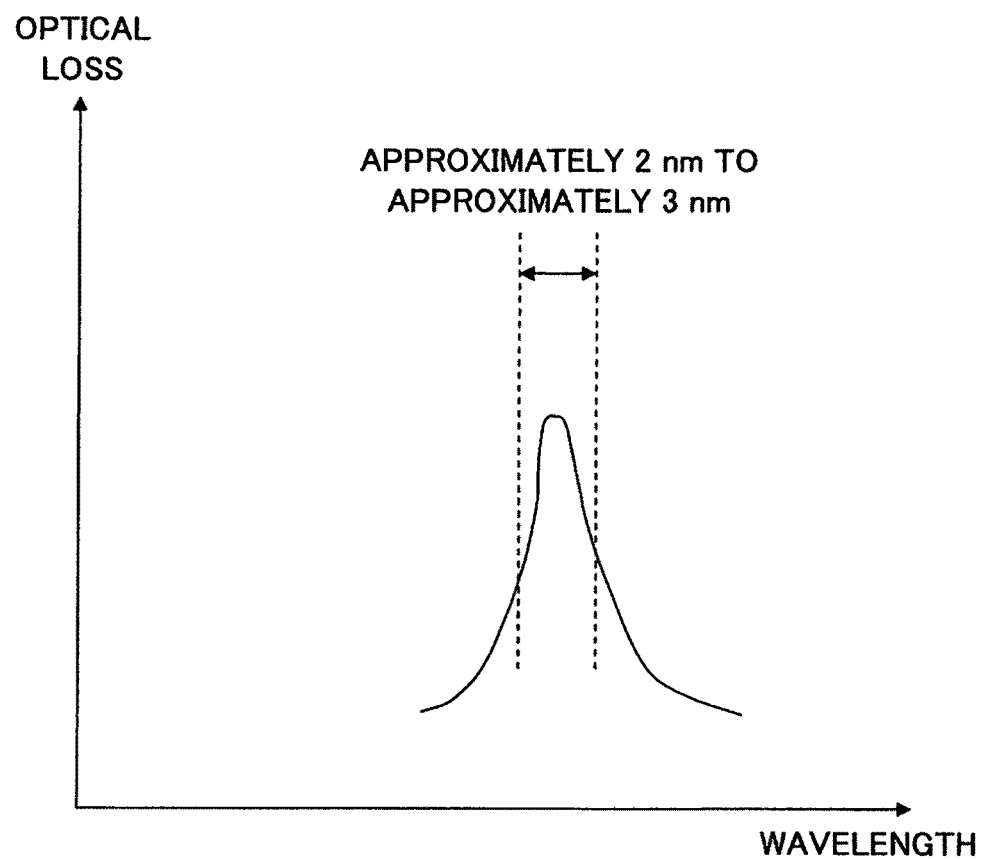
FIG. 6 is a diagram illustrating a spectrum width of output light of a Fabry-Perot laser diode.

On the other hand, a spectrum width of the output light of the FP-LD is several nm (approximately 2 nm to approximately 3 nm) and relatively wide, as illustrated in FIG. 6. FIG. 6 is a diagram illustrating the spectrum width of the output light of the FP-LD. Hence, the FP-LD is substantially unaffected by the SBS. In the spectrum range of several nm, the effects caused by the optical loss which slopes with respect to the wavelength is negligible.

If the FBT-LD is used for the light source of the monitoring light, it is possible to freely vary the wavelength. Hence, as will be described later, it is possible in this case to make measurements for a plurality of wavelengths when monitoring the optical loss, and to obtain more accurate measurement results.

Photodiodes using materials such as InGaAs (indium gallium arsenide) and having quantum efficiencies that do not deteriorate up to the wavelength of approximately 1900 nm have bee reduced to practice. Hence, when setting the monitoring light in the band B6 in the long wavelength region of 140 nm or greater, it is possible to use such diodes for the photodiode 16.

The embodiment described above uses the monitoring light having the wavelength longer than the wavelength of the WDM signal light forming the main signal light. Hence, when the optical loss of the DCF increases, it is possible to detect the increase in the optical loss of the DCF before the increase in the optical loss of the main signal light reaches the limit. In addition, by using the monitoring light in the band other than that of the main signal light, it is possible to detect the optical loss of the DCF in a simple manner without being affected by the change in the power caused by the setting to increase or decrease the wavelength.

Second Embodiment

Figure 7:
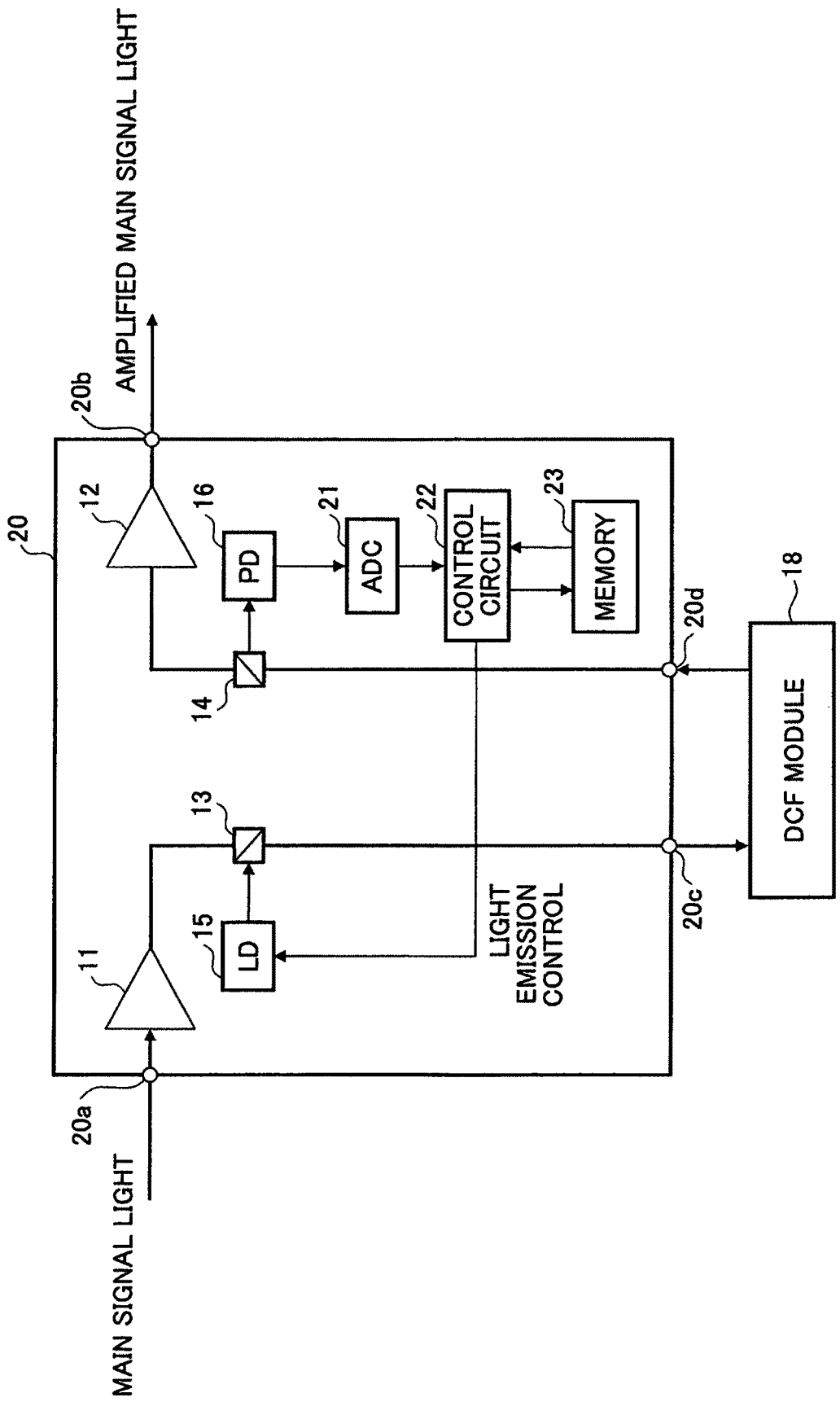
FIG. 7 is a diagram illustrating a structure of the optical amplifier module in a second embodiment of the present invention.

FIG. 7 is a diagram illustrating a structure of the optical amplifier module in a second embodiment of the present invention. In FIG. 7, those parts that are the same as those corresponding parts in FIG. 2 are designated by the same reference numerals.

In FIG. 7, an optical amplifier module 20 includes optical amplifiers 11 and 12, optical filters 13 and 14, a laser diode 15, a photodiode 16, an analog-to-digital converter (ADC) 21, a control circuit 22, and a memory 23.

The optical amplifier 11 amplifies a WDM signal light, forming a main signal light supplied from a port 20a, and supplies an amplified main signal light to the optical filter 13. The laser diode 15 generates monitoring light having a wavelength different from that of the WDM signal light, and supplies the monitoring light to the optical filter 13. The optical filter 13 multiplexes the monitoring light output from the laser diode 15 and the WDM signal light, and supplies multiplexed signal light to a DCF module 18 via a port 20c.

The optical signal subjected to a dispersion compensation by a DCF within the DCF module 18 is supplied from a port 20d to the optical filter 14. The optical filter 14 demultiplexes the monitoring light and the WDM signal light forming the main signal light, supplies the monitoring light to the photodiode 16, and supplies the WDM signal light forming the main signal light to the optical amplifier 12.

The photodiode 16 detects a light intensity of the monitoring light supplied from the optical filter 14, and supplies a detection voltage indicative of the detected light intensity to the ADC 21. The optical amplifier 12 amplifies the WDM signal light forming the main signal light supplied from the optical filter 14, and outputs the amplified main signal light from a port 20b. The ADC 21 converts the detection voltage into a digital signal, and supplies the digital signal to the control circuit 22.

The control circuit 22 controls a driving current of the laser diode 15 in order to control a light emission from the laser diode 15. The control circuit 22 regards a value in accordance with the driving current of the laser diode 15 as being an estimated value of the light intensity of the monitoring light output from the laser diode 15, and regards a difference between this estimated value and the light intensity of the monitoring light detected by the photodiode 16 as being the optical loss value of the DCF module 18. Further, the control circuit 22 stores the optical loss value of the DCF module 18 obtained from the detection voltage that is output from the photodiode 16 at an initial starting time of the optical amplifier module 20 into the memory 23. The control circuit 22 obtains a difference between an optical loss value that is similarly obtained during operation of the optical amplifier module 20 and the optical loss value at the initial starting time, and regards this difference as an optical loss changing amount.

The control circuit 22 may constantly control the driving current of the laser diode 15 constant, store the detection voltage output from the photodiode 16 at the initial starting time into the memory 23, and regard as the optical loss changing amount the difference between the detection voltage output from the photodiode 16 during operation of the optical amplifier module 20 and the detection voltage stored in the memory 23. If the optical loss changing amount exceeds a predetermined threshold value, the control circuit 22 generates an alarm signal that is notified to the management unit (not illustrated) that forms the host unit.

Figure 8:
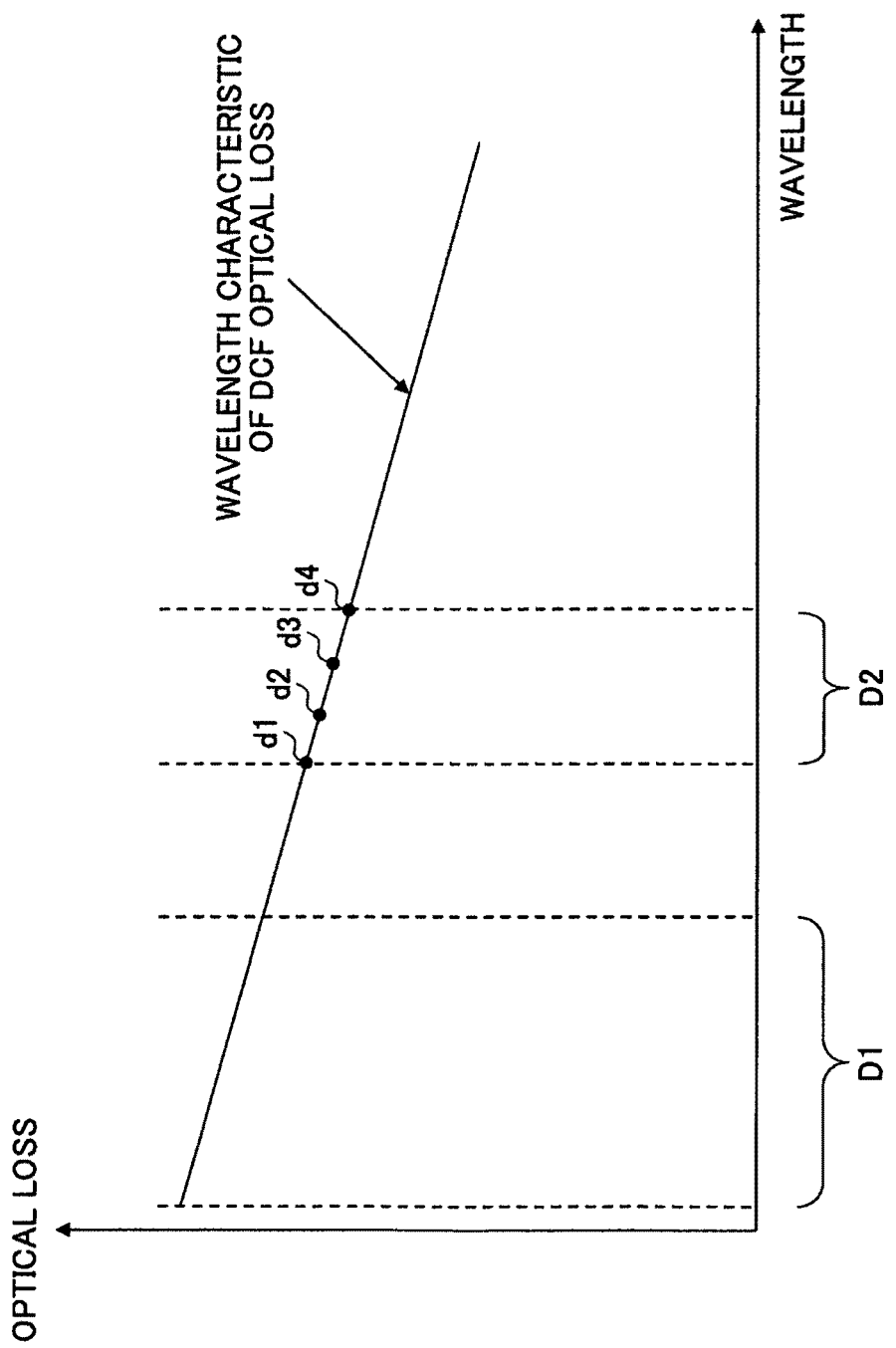
FIG. 8 is a diagram illustrating optical loss values with respect to a plurality of wavelengths.

On the other hand, in the case where the FBT-LD is used as the laser diode 15, the control circuit 22 successively changes the output wavelength of the laser diode 15 at the initial starting time. In addition, the control circuit 22 obtains the optical loss value for a plurality of wavelengths of the DCF module 18 from the detection voltages that are output from the photodiode 16 for the plurality of wavelengths, and stores into the memory 23 the optical loss values for a plurality of wavelengths d1, d2, d3 and d4 within an optimum wavelength range of the monitoring light as illustrated in FIG. 8, for example. FIG. 8 is a diagram illustrating the optical loss values with respect to the plurality of wavelengths. In FIG. 8, D1 denotes a main signal band of the main signal light.

During operation of the optical amplifier module 20, the control circuit 22 successively changes the output wavelength of the laser diode 15, and obtains the optical loss value of the DCF module 18 from the detection voltage for the plurality of wavelengths detected by the photodiode 16. Moreover, the control circuit 22 stores the optical loss value for each of the plurality of wavelengths, and store the optical loss value into the memory 23.

Figure 9:
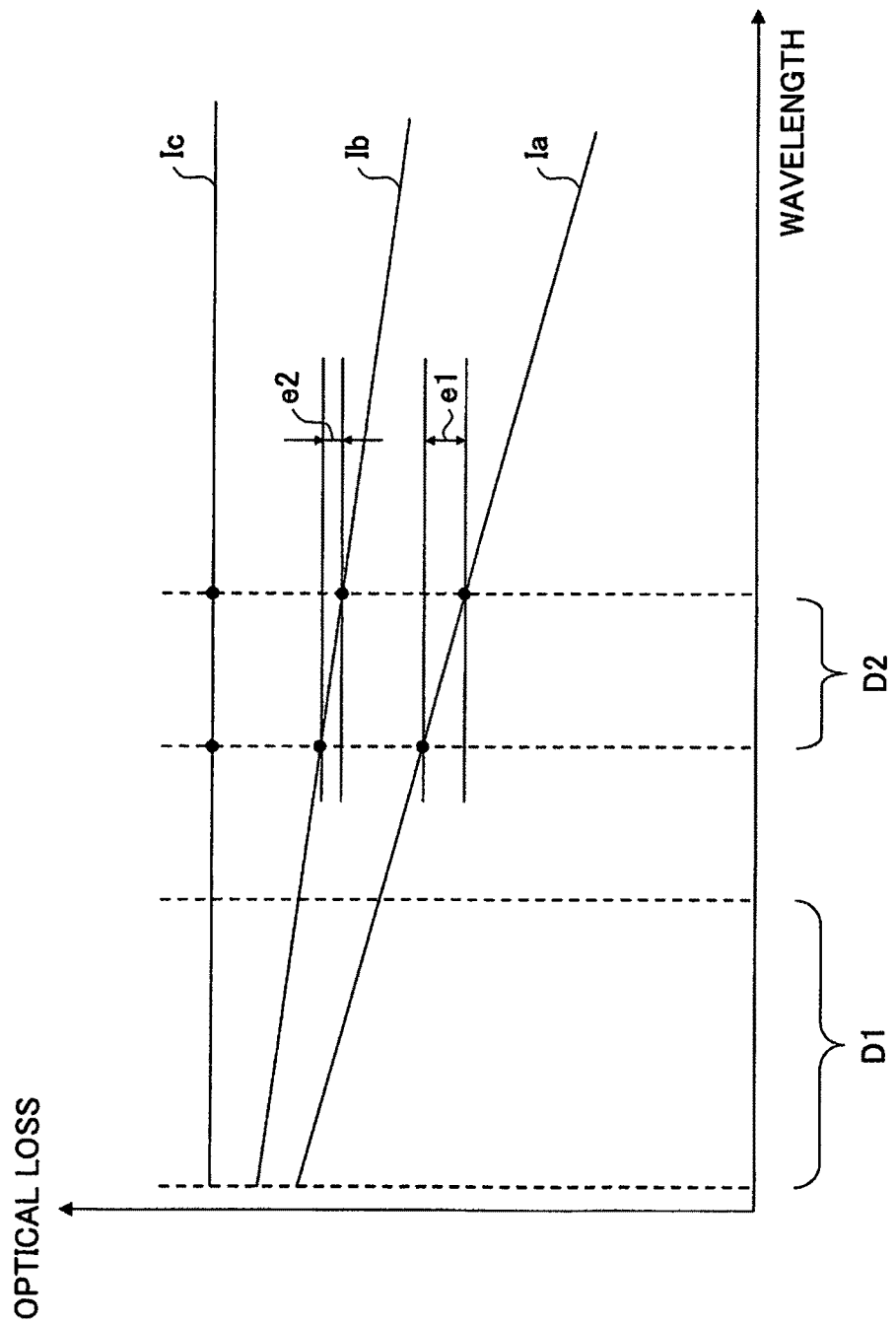
FIG. 9 is a diagram illustrating a change in a wavelength characteristic of a DCF with aging.

The wavelength characteristic of the optical loss in the DCF of the DCF module 18 has a relatively large negative slope as indicated by a solid line Ia in FIG. 9. The negative slope refers to a rightwardly declining slope in FIG. 9. FIG. 9 is a diagram illustrating a change in the wavelength characteristic of the DCF with aging. With aging, the absolute value of the slope becomes smaller as indicated by a solid line Ib in FIG. 9, and the slope becomes approximately zero (0) as indicated by a solid line Ic in FIG. 9 as the aging of the DCF module 18 further progresses. In FIG. 9, D1 denotes the main signal band, and D2 denotes the optimum wavelength range.

Accordingly, the control circuit 22 may obtain a difference e1 or e2 between the optical loss values at the wavelengths on both ends of the optimum wavelength range D2 of the monitoring light or, the slope between the wavelengths on both ends of the optimum wavelength range D2 of the monitoring light. If an absolute value of the difference or an absolute value of the slope becomes less than or equal to a predetermined threshold value, the control circuit 22 may generate an alarm signal that is notified to the management unit (not illustrated) that forms the host unit.

In addition, the control circuit 22 may generate the alarm signal during operation of the optical amplifier module 20, if the optical loss changing amount from the initial starting time exceeds a predetermined threshold value and the absolute value of the difference between the optical loss values at the wavelengths on both ends of the optimum wavelength range D2 of the monitoring light or, the absolute value of the slope between the wavelengths on both ends of the optimum wavelength range D2 of the monitoring light becomes less than or equal to the predetermined threshold value.

In these cases, it is possible to prevent the alarm signal from being generated erroneously due to inconsistencies in measurements or the like. In addition, the control circuit 22 may generate the alarm signal, if the optical loss changing amount from the initial starting time exceeds a predetermined threshold value or, the absolute value of the difference between the optical loss values at the wavelengths on both ends of the optimum wavelength range D2 of the monitoring light or, the absolute value of the slope between the wavelengths on both ends of the optimum wavelength range D2 of the monitoring light becomes less than or equal to the predetermined threshold value.

During operation of the optical amplifier module 20, the control circuit 22 may constantly obtain and judge the optical loss changing amount or, the difference between the optical loss values or, the inclination described above. However, the control circuit 22 may periodically obtain and judge the optical loss changing amount or, the difference between the optical loss values or, the inclination described above, every time a predetermined time elapses. Moreover, the rate at which the optical loss value of the DCF changes differ depending on the environment, such as the environment temperature in which the DCF is used, and the amount of dispersion compensation of the DCF. In general, however, the optical loss value of the DCF changes at a rate of approximately 2 dB per three (3) to five (5) years, and thus, it would be sufficient to monitor and judge the optical loss changing amount or, the difference between the optical loss values or, the inclination described above at a rate (or frequency) of once a day or, once a week, for example.

The length of the DCF varies depending on the amount of dispersion compensation of the DCF, and the absolute value of the optical loss value of the entire DCF varies depending on the length of the DCF. Because the optical loss changing amount differs depending on the absolute value of the optical loss value, the threshold value of the optical loss changing amount may be determined depending on the absolute value of the optical loss value.

Third Embodiment

Figure 10:
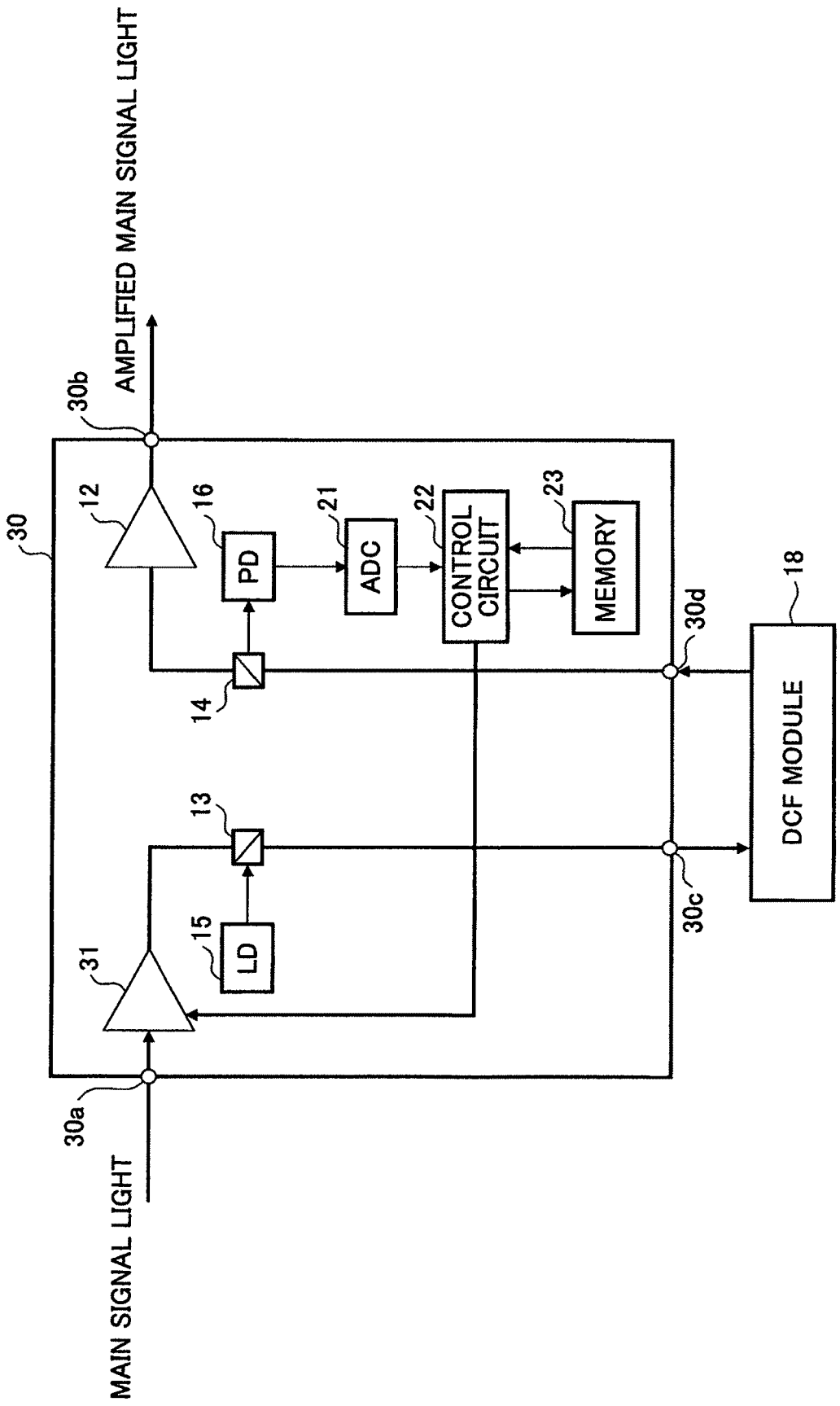
FIG. 10 is a diagram illustrating a structure of the optical amplifier module in a third embodiment of the present invention.

FIG. 10 is a diagram illustrating a structure of the optical amplifier module in a third embodiment of the present invention. In FIG. 10, those parts that are the same as those corresponding parts in FIG. 7 are designated by the same reference numerals.

In FIG. 10, an optical amplifier module 30 includes optical amplifiers 31 and 12, optical filters 13 and 14, a laser diode 15, a photodiode 16, an analog-to-digital converter (ADC) 21, a control circuit 22, and a memory 23.

The optical amplifier 31 amplifies a WDM signal light, forming a main signal light supplied from a port 30a, and supplies an amplified main signal light to the optical filter 13. The laser diode 15 generates monitoring light having a wavelength different from that of the WDM signal light, and supplies the monitoring light to the optical filter 13. The optical filter 13 multiplexes the monitoring light output from the laser diode 15 and the WDM signal light, and supplies multiplexed signal light to a DCF module 18 via a port 30c.

The optical signal subjected to a dispersion compensation by a DCF within the DCF module 18 is supplied from a port 30d to the optical filter 14. The optical filter 14 demultiplexes the monitoring light and the WDM signal light forming the main signal light, supplies the monitoring light to the photodiode 16, and supplies the WDM signal light forming the main signal light to the optical amplifier 12.

The photodiode 16 detects a light intensity of the monitoring light supplied from the optical filter 14, and supplies a detection voltage indicative of the detected light intensity to the ADC 21. The optical amplifier 12 amplifies the WDM signal light forming the main signal light supplied from the optical filter 14, and outputs the amplified main signal light from a port 30b. The ADC 21 converts the detection voltage into a digital signal, and supplies the digital signal to the control circuit 22.

The control circuit 22 stores the optical loss value of the DCF module 18 obtained from the detection voltage that is output from the photodiode 16 at an initial starting time of the optical amplifier module 20 into the memory 23. In addition, the control circuit 22 confirms the optical loss changing amount by comparing the optical loss value stored in the memory 23 and the optical loss value monitored during operation of the optical amplifier module 30. If the optical loss changing amount exceeds a predetermined threshold value, the control circuit 22 generates an alarm signal that is notified to the management unit (not illustrated) that forms the host unit.

When an abnormality is generated, the input level of the optical amplifier 12 at the latter stage may decrease and deteriorate the transmission quality, depending on the initial optical power state of the WDM signal light and the optical loss value of the DCF module 18. In a worst case scenario, the WDM signal light becomes less than or equal to the input dynamic range of the optical amplifier 12 and cause the optical amplifier 12 to be cut off.

For this reason, in this third embodiment, as a temporary remedy other than generating the alarm signal, the control circuit 22 computes the optical loss changing amount in the WDM signal band of the main signal light from the optical loss value of the monitoring light. Further, the control circuit 22 carries out a control to increase the gain of the optical amplifier 31 in order to correct the optical loss changing amount.

It is desirable to prevent the SBS and Four Wave Mixing (FWM) from being generated in the DCF module 18, which are non-linear phenomena of the main signal light. For this reason, the control circuit 22 increases the gain of the optical amplifier 31 in order to increase the light intensity by approximately 1 dB to 2 dB for the purposes of achieving the temporary remedy.

Fourth Embodiment

Figure 11:
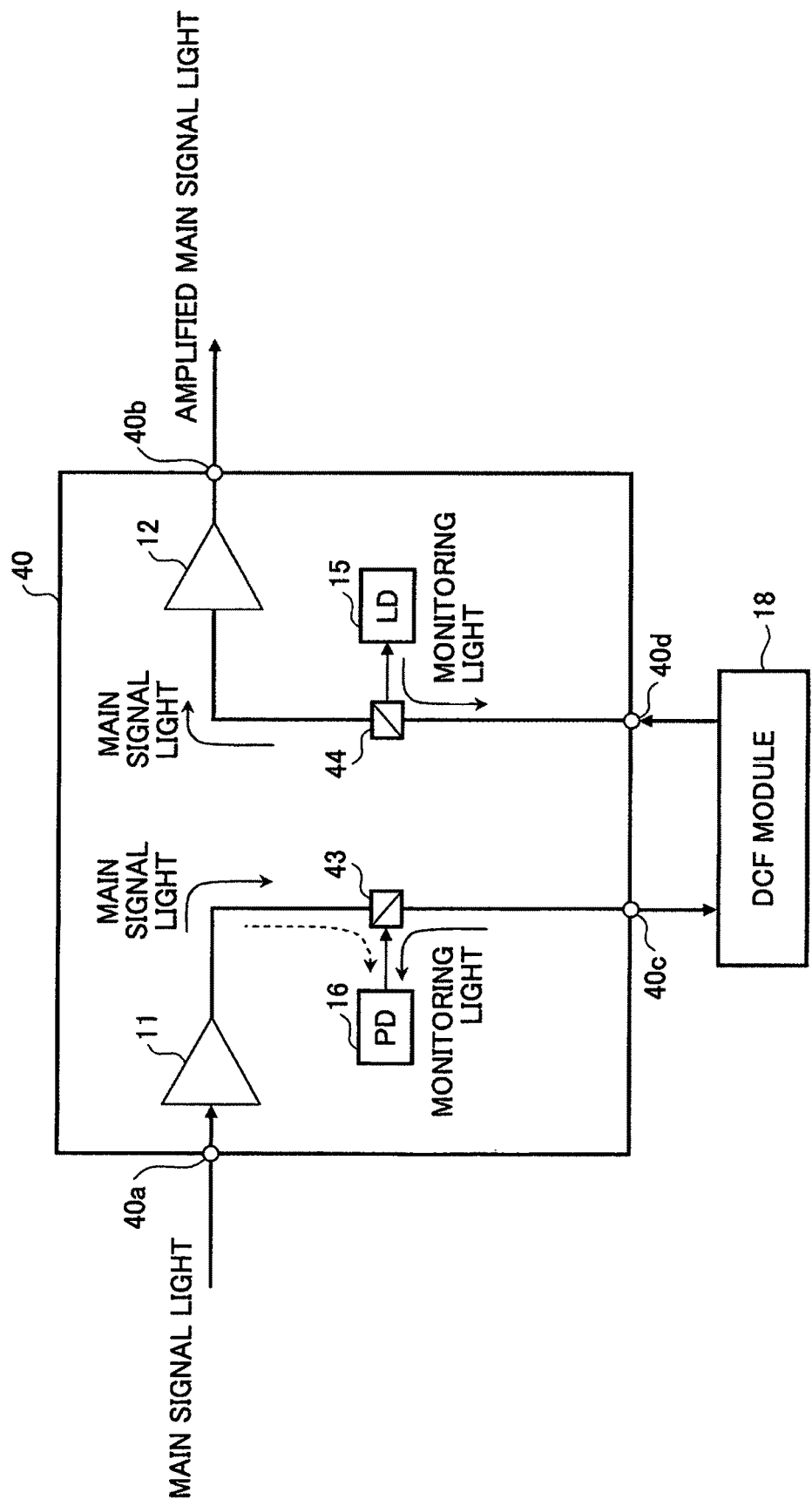
FIG. 11 is a diagram illustrating a structure of the optical amplifier module in a fourth embodiment of the present invention.

FIG. 11 is a diagram illustrating a structure of the optical amplifier module in a fourth embodiment of the present invention. In FIG. 11, those parts that are the same as those corresponding parts in FIG. 2 are designated by the same reference numerals.

In FIG. 11, an optical amplifier module 40 includes optical amplifiers 11 and 12, optical filters 43 and 44, a laser diode (LD) 15, and a photodiode (PD) 16.

The optical amplifier 11 amplifies a wavelength division multiplexed (WDM) signal light, forming a main signal light supplied from a port 40a, and supplies an amplified main signal light to the optical filter 43. The optical filter 43 passes the WDM signal light forming the main signal light, and supplies the WDM signal light to a DCF module 18 via a port 40c, and also demultiplexes monitoring light supplied from the port 40c and supplies the monitoring light to the photodiode 16.

The photodiode 16 detects a light intensity of the monitoring light supplied from the optical filter 43, and supplies a detection voltage indicative of the detected light intensity to the management unit (not illustrated) which forms the host unit.

The optical signal subjected to a dispersion compensation by a DCF within the DCF module 18 is supplied from a port 40d to the optical filter 44. The optical filter 44 passes the WDM signal light forming the main signal light supplied from a port 40d, and supplies the WDM signal light to the optical amplifier 12. In addition, the optical amplifier 44 multiplexes the monitoring light output from the laser diode 15 and the WDM signal light forming the main signal light, and supplies the multiplexed light to the DCF module 18 via the port 40d.

The laser diode 15 generates the monitoring light having a wavelength different from that of the WDM signal light. The optical amplifier 12 amplifies the WDM signal light forming the main signal light supplied from the optical filter 14, and outputs the amplified main signal light from a port 40b.

According to the first through third embodiments described above, the WDM signal light forming the main signal light and the monitoring light propagate in the same direction. On the other hand, according to the fourth embodiment, the WDM signal light forming the main signal light and the monitoring light propagate in opposite directions.

In the first through third embodiments, the light intensity of the monitoring light detected by the photodiode 16 may be affected by a leak of the WDM signal light, depending on a crosstalk characteristic (for example, approximately −30 dB) of the optical filter 14 and the level of the main signal light.

On the other hand, in the fourth embodiment, the amount of leak of the WDM signal light forming the main signal light, from the optical filter 43 to the photodiode 16, depends on a directivity characteristic of the optical filter 43. The directivity characteristic (for example, approximately −60 dB) of a general optical filter has a suppression characteristic of 20 dB to 30 dB or greater compared to the crosstalk characteristic (for example, approximately −30 dB). For this reason, the leak of the WDM signal light to the photodiode 16 is basically negligible, and the light intensity of the monitoring light detected by the photodiode 16 is unaffected by the leak of the WDM signal light.

Of course, the WDM signal light forming the main signal light and the monitoring light may propagate in opposite directions in each of the second and third embodiments, in a manner similar to the fourth embodiment.

Although the embodiments are numbered with, for example, "first", "second", "third" or, "fourth", the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical amplifier module comprising:
   a first optical amplifier configured to amplify main signal light that is to be supplied to a dispersion compensation fiber;

a monitoring light generating part configured to generate monitoring light having a wavelength longer than a wavelength of the main signal light;

a multiplexing part configured to multiplex the monitoring light generated by the monitoring light generating part and the main signal light that is amplified by the first optical amplifier;

a demultiplexing part configured to demultiplex the monitoring light from the main signal light supplied from the dispersion compensation fiber;

a light intensity detecting part configured to detect a light intensity of the monitoring light demultiplexed by the demultiplexing part; and a second optical amplifier configured to amplify the main signal light output from the demultiplexing part in order to provide amplified main signal light.

2. The optical amplifier module as claimed in claim 1, further comprising:

a storage part configured to store an optical loss value in the dispersion compensation fiber obtained from the light intensity of the monitoring light detected by the light intensity detecting part at an initial starting time; and a first alarm generating part configured to generate an alarm based on a comparison of an optical loss changing amount and a first threshold value, wherein the optical loss changing amount is a difference between the optical loss value at the initial starting time stored in the storage part and an optical loss value in the dispersion compensation fiber obtained from the light intensity of the monitoring light detected by the light intensity detecting part during operation of the optical amplifier module.

3. The optical amplifier module as claimed in claim 2, further comprising:

a gain control part configured to control a gain of the first optical amplifier depending on the optical loss changing amount.

4. The optical amplifier module as claimed in claim 2, wherein the first alarm generating part operates periodically.

5. The optical amplifier module as claimed in claim 2, wherein the monitoring light generating part generates monitoring light having a plurality of wavelengths, and the optical amplifier module further comprises:

a second alarm generating part configured to generate an alarm based on a comparison of an absolute value of a slope of a wavelength versus optical loss characteristic and a second threshold value, wherein the slope of the wavelength versus optical loss characteristic is obtained from optical loss values in the dispersion compensation fiber with respect to light intensities of the monitoring light having the plurality of wavelengths detected by the light intensity detecting part.

6. The optical amplifier module as claimed in claim 5, wherein the second alarm generating part operates periodically.

7. The optical amplifier module as claimed in claim 2, wherein the monitoring light generating part generates monitoring light having a plurality of wavelengths, and the optical amplifier module further comprises:

a second alarm generating part configured to generate an alarm based on a comparison of a difference in optical loss values for different wavelengths and a second threshold value, wherein the difference in the optical loss values for the different wavelengths is obtained from optical loss values in the dispersion compensation fiber with respect to the light intensity of the monitoring light having the plurality of wavelengths detected by the light intensity detecting part.

8. The optical amplifier module as claimed in claim 7, wherein the second alarm generating part operates periodically.

9. The optical amplifier module as claimed in claim 1, wherein the monitoring light generating part generates monitoring light having a plurality of wavelengths, and the optical amplifier module further comprises:

an alarm generating part configured to generate an alarm based on a comparison of an absolute value of a slope of a wavelength versus optical loss characteristic and a threshold value, wherein the slope of the wavelength versus optical loss characteristic is obtained from optical loss values in the dispersion compensation fiber with respect to light intensities of the monitoring light having the plurality of wavelengths detected by the light intensity detecting part.

10. The optical amplifier module as claimed in claim 1, wherein the monitoring light generating part generates monitoring light having a plurality of wavelengths, and the optical amplifier module further comprises:

an alarm generating part configured to generate an alarm based on a comparison of a difference in optical loss values for different wavelengths and a threshold value, wherein the difference in the optical loss values for the different wavelengths is obtained from optical loss values in the dispersion compensation fiber with respect to the light intensity of the monitoring light having the plurality of wavelengths detected by the light intensity detecting part.

11. The optical amplifier module as claimed in claim 1, wherein the monitoring light generating part comprises a distributed feedback laser diode.

12. The optical amplifier module as claimed in claim 1, wherein the monitoring light generating part comprises a full band tunable laser diode.

13. The optical amplifier module as claimed in claim 1, wherein the monitoring light generating part comprises a Fabry-Perot laser diode.

14. The optical amplifier module as claimed in claim 1, wherein the multiplexing part multiplexes the monitoring light that is generated by the monitoring light generating part and propagates in a direction opposite to the main signal light supplied to the dispersion compensation fiber between the dispersion compensation fiber and the second optical amplifier, and wherein the demultiplexing part demultiplexes the monitoring light that propagates in a direction opposite to the main signal light between the first optical amplifier and the dispersion compensation fiber.

15. A dispersion compensation fiber loss detection method for detecting an optical loss in a dispersion compensation fiber coupled to an optical amplifier module, comprising:

amplifying main signal light that is to be supplied to the dispersion compensation fiber by a first optical amplifier of the optical amplifier module;

generating monitoring light having a wavelength longer than a wavelength of the main signal light;

multiplexing the monitoring light and the main signal light that is amplified by the amplifying;

demultiplexing the monitoring light from the main signal light supplied from the dispersion compensation fiber;

first detecting a light intensity of the monitoring light that is demultiplexed by the demultiplexing; and second detecting the optical loss in the dispersion compensation fiber from the light intensity of the monitoring light that is detected by the first detecting.

16. The dispersion compensation fiber loss detection method as claimed in claim 15, further comprising:
    storing, in a storage part, a value of the optical loss in the dispersion compensation fiber that is detected by the second detecting at an initial starting time; and
    generating an alarm based on a comparison of an optical loss changing amount and a first threshold value, wherein the optical loss changing amount is a difference between the value of the optical loss at the initial starting time stored in the storage part and a value of the optical loss in the dispersion compensation fiber that is detected by the second detecting during operation of the optical amplifier module.

17. The dispersion compensation fiber loss detection method as claimed in claim 16, further comprising:
    controlling a gain of the first optical amplifier depending on the optical loss changing amount.

18. The dispersion compensation fiber loss detection method as claimed in claim 16, wherein the generating generates monitoring light having a plurality of wavelengths, and further comprising:
    generating an alarm based on a comparison of an absolute value of a slope of a wavelength versus optical loss characteristic and a second threshold value, wherein the slope of the wavelength versus optical loss characteristic is obtained from values of the optical loss in the dispersion compensation fiber detected by the second detecting with respect to light intensities of the monitoring light having the plurality of wavelengths that are detected by the first detecting.

19. The dispersion compensation fiber loss detection method as claimed in claim 16, wherein the generating generates monitoring light having a plurality of wavelengths, and further comprising:
    generating an alarm based on a comparison of a difference in values of the optical loss for different wavelengths and a second threshold value,
    wherein the difference in the values of the optical loss for the different wavelengths is obtained from values of the optical loss in the dispersion compensation fiber detected by the second detecting with respect to the light intensity of the monitoring light having the plurality of wavelengths that are detected by the first detecting.

20. The dispersion compensation fiber loss detection method as claimed in claim 15, wherein the generating generates the monitoring light using a diode selected from a group consisting of a distributed feedback laser diode, a full band tunable laser diode, and a Fabry-Perot laser diode.

* * * * *